(12) United States Patent
Takaku et al.

(10) Patent No.: US 6,694,198 B2
(45) Date of Patent: Feb. 17, 2004

(54) CONTROL SYSTEM, CONTROL DEVICE AND CONTROL METHOD

(75) Inventors: Yoshiyuki Takaku, Tokyo (JP); Makoto Sato, Tokyo (JP)

(73) Assignee: Sony Corporation (JP)

( * ) Notice: Subject to any disclaimer, the term of this patent is extended or adjusted under 35 U.S.C. 154(b) by 303 days.

(21) Appl. No.: 09/840,491

(22) Filed: Apr. 23, 2001

(65) Prior Publication Data

US 2002/0002407 A1 Jan. 3, 2002

(30) Foreign Application Priority Data

Apr. 24, 2000 (JP) .................................. P2000-123050

(51) Int. Cl.7 ............................................. G05B 15/00
(52) U.S. Cl. ............................. 700/83; 700/17; 700/1; 709/201; 709/328
(58) Field of Search .......................... 700/1, 2, 19, 20, 700/83, 9, 17, 11–12; 709/328, 201, 203, 217, 218, 220; 345/173, 326; 710/10, 72

(56) References Cited

U.S. PATENT DOCUMENTS

| | | | | |
|---|---|---|---|---|
| 6,041,364 A | * | 3/2000 | Lortz et al. ................. | 709/321 |
| 6,148,241 A | * | 11/2000 | Ludtke et al. ................ | 700/83 |
| 6,198,479 B1 | * | 3/2001 | Humpleman et al. ....... | 345/733 |
| 6,421,069 B1 | * | 7/2002 | Ludtke et al. .............. | 345/762 |
| 6,456,892 B1 | * | 9/2002 | Dara-Abrams et al. ....... | 700/83 |
| 6,466,971 B1 | * | 10/2002 | Humpleman et al. ....... | 709/220 |
| 6,496,575 B1 | * | 12/2002 | Vasell et al. ........... | 379/102.05 |

* cited by examiner

*Primary Examiner*—Ramesh Patel
*Assistant Examiner*—Ronald D Hartman, Jr.
(74) *Attorney, Agent, or Firm*—Lerner, David, Littenberg, Krumholz & Mentlik, LLP

(57) ABSTRACT

In a control system in which a control device and an information processing device are connected to each other with a predetermined data bus, a control system, a control device, and a control method in which the control device can omits many processing procedures are proposed. A control device stores corresponding definite information corresponding to definite information stored in the information processing device and defining functions of the information processing device. The control device acquires the definite information from the information processing device, recognizes the functions of the information processing device on the basis of the corresponding definite information which is stored in the control device, and controls the information processing device, thus making it possible to efficiently and exactly control the information processing device.

18 Claims, 23 Drawing Sheets

| OFFSET | NAME | OPERATION |
|---|---|---|
| 000h | STATE_CLEAR | CONDITION AND CONTROL INFORMATION |
| 004h | STATE_SET | SET STATE_CLEAR BIT |
| 008h | NODE_IDs | INDICATE NODE ID OF 16 BITS |
| 00Ch | RESET_START | START COMMAND RESET |
| 018h-01Ch | SPLIT_TIMEOUT | DEFINE MAXIMUM TIME OF SPLIT |
| 200h | CYCLE_TIME | CYCLE TIME |
| 210h | BUSY_TIMEOUT | DEFINE LIMITATION OF RETRY |
| 21Ch | BUS_MANAGER | SHOW ID OF BUS MANAGER |
| 220h | BANDWIDTH_AVAILABLE | SHOW AVAILABLE BANDS FOR ISOCHRONOUS COMMUNICATION |
| 224h-228h | CHANNELS_AVAILABLE | SHOW USE CONDITION OF EACH CHANNEL |

FIG.4

| 400h | 04h | crc_length | rom_crc_value |
|---|---|---|---|

Bus_info_block

| 404h | "1394" | | | | |
|---|---|---|---|---|---|
| 408h | irmc/cmc/isc/bmc reserved | cyc_clk_acc | max_rec | reserved | |
| 40Ch | Company_ID | | | | Chip_ID_hi |
| 410h | Chip_ID_lo | | | | |

Root_directory

| 414h | root_lengh | CRC |
|---|---|---|
| 418h | 03h | module_vender_id |
| 41Ch | 0Ch | node_capabilities |
| 420h | 8Dh | node_unique_id offset |
| 424h | D1h | unit_directory offset |
| 428h | | Optional. | unit_directory

| unit_directory_length | CRC |
|---|---|
| 12h | unit_spec_id |
| 13h | unit_sw_version |
| | Optional. |

FIG. 6

| Address | Register |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 7

FIG. 8A oMPR

| data rate capability | broadcast channel base | non-persistent extension field | persistent extension field | reserved | number of output plugs |
|---|---|---|---|---|---|
| 2 | 6 | 8 | 8 | 3 | 5 (bit) |

FIG. 8B oPCR[n]

| on-line | broadcast connection counter | point-to-point connection counter | reserved | channel number | reserved | data rate | overhead ID | payload |
|---|---|---|---|---|---|---|---|---|
| 1 | 6 | 6 | 2 | 6 | 2 | 2 | 4 | 10 (bit) |

FIG. 8C iMPR

| data rate capability | reserved | non-persistent extension field | persistent extension field | reserved | number of input plugs |
|---|---|---|---|---|---|
| 2 | 6 | 8 | 8 | 3 | 5 (bit) |

FIG. 8D iPCR[n]

| on-line | broadcast connection counter | point-to-point connection counter | reserved | channel number | reserved |
|---|---|---|---|---|---|
| 1 | 1 | 6 | 2 | 6 | 16 (bit) |

| The General Subunit Identifier Descriptor | |
|---|---|
| address | contents |
| 00 00₁₆ | descriptor_length |
| 00 01₁₆ | |
| 00 02₁₆ | generation_ID |
| 00 03₁₆ | size_of_list_ID |
| 00 04₁₆ | size_of_object_ID |
| 00 05₁₆ | size_of_object_position |
| 00 06₁₆ | number_of_root_object_lists(n) |
| 00 07₁₆ | |
| 00 08₁₆ | root_object_list_id_0 |
| ⋮ | |
| ⋮ | ⋮ |
| ⋮ | root_object_list_id_n-1 |
| ⋮ | |
| ⋮ | subunit_dependent_length |
| ⋮ | |
| ⋮ | subunit_dependent_information |
| ⋮ | |
| ⋮ | |
| ⋮ | manufacturer_dependent_length |
| ⋮ | |
| ⋮ | manufacturer_dependent_information |
| ⋮ | |
| ⋮ | |

FIG. 11

| generation_ID values ||
|---|---|
| generation_ID | meaning |
| $00_{16}$ | Data structures and command sets as specified in the AV/C General Specification, version 3.0 |
| all others | reserved for future specification |

FIG. 12

| List ID Value Assignment Ranges ||
|---|---|
| range of values | list definition |
| $0000_{16}$-$0FFF_{16}$ | reserved |
| $1000_{16}$-$3FFF_{16}$ | subunit-type dependent |
| $4000_{16}$-$FFFF_{16}$ | reserved |
| $1\,0000_{16}$-max list ID value | subunit-type dependent |

FIG. 13

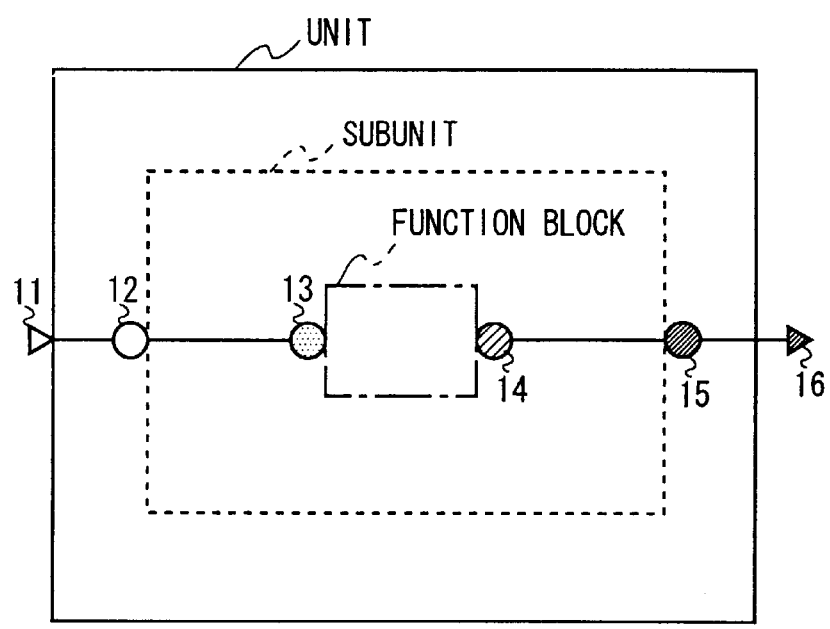
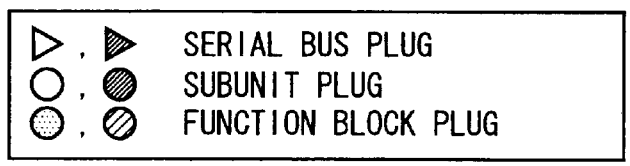
FIG. 18

| address offset | Contents | |
|---|---|---|
| 00 00₁₆ | audio_subunit_dependent_info_fields_length | |
| 00 01₁₆ | | |
| 00 02₁₆ | audio_subunit_version | |
| 00 03₁₆ | number_of_configurations(p) | |
| 00 04₁₆ | configuration[1]_dependent_information | configuration[]_dependent_information_length |
| 00 05₁₆ | | |
| 00 06₁₆ | | configuration_ID |
| 00 07₁₆ | | |
| ⋮ | | master_cluster_information |
| ⋮ | | |
| ⋮ | | number_of_subunit_source_plug_link_information(p) |
| ⋮ | | subunit_source_plug[0]_link_information |
| ⋮ | | ⋮ |
| ⋮ | | subunit_source_plug[p-1]_link_information |
| ⋮ | | number_of_function_block_dependent_information(m) |
| ⋮ | | function_block_dependent_information[1] |
| ⋮ | | |
| ⋮ | | function_block_dependent_information[m] |
| ⋮ | ⋮ | |
| ⋮ | configuration[p]_dependent_information | |
| ⋮ | | |

CONTROL SYSTEM, CONTROL DEVICE AND CONTROL METHOD

CROSS-REFERENCE TO RELATED APPLICATIONS

The present application claims priority from Japanese Application No. 2000-123050 filed Apr. 24, 2000, the disclosure of which is hereby incorporated by reference herein.

BACKGROUND OF THE INVENTION

This invention relates to a control system, a control device and a control method, and for example, is suitably applied to a control system, a control device, and a control method at the time when data transmission is performed between information processing devices which are connected to each other with a bus line of IEEE1344 system.

Recently, a control system has been proposed to transmit stream data between a plurality of information processing devices which are connected to each other with a high performance serial data bus of institute of electrical and electronics engineers (IEEE) 1394 system (hereinafter, referred to as an IEEE1394 bus).

In this control system, relatively large amount of data is transmitted through the IEEE1394 bus at real time and data such as a control command is transmitted without fail, thus making is possible to transmit/receive stream data, control commands and so on between the information processing devices connected with the IEEE1394 bus.

Further, in the control system, any of the plurality of information processing devices connected with the IEEE1394 bus is a controller for controlling the plurality of information processing devices.

By the way, in this kind of control system, the information processing devices connected with the IEEE1394 bus define and hold detailed specification information about internal functions of each information processing device, and the controller acquires the specification information from each information processing device, analyzes the functions of the information processing devices connected with the IEEE1394 bus, and performs processing such as changing of function settings for the information processing devices, on the basis of the analysis result, thus controlling each information processing device.

Such a controller has a bad efficiency problem in which it has to execute a lot of processes.

SUMMARY OF THE INVENTION

In view of the foregoing, an object of this invention is to provide a control system, a control device, and a control method which can efficiently and exactly control the functions of information processing devices.

The foregoing object and other objects of the invention have been achieved by the provision of a control system, a control device and a control method. The control device is connected by a data bus to at least one information processing device to be controlled. The information processing device stores definite information defining functions of the information processing device. The control device stores corresponding definite information which corresponds to the definite information stored in the information processing device, acquires the definite information from the information processing device, recognizes the functions of the information processing device on the basis of the corresponding definite information, and controls the information processing device based on the recognized functions, thus making it possible to exactly and efficiently control the functions of the information processing device.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a diagram explaining an example of positions, names and operations of a main CRS;

FIG. 6 is a diagram explaining an example of a bus info block, a root directory, and a unit directory;

FIG. 7 is a diagram explaining the configuration of the PCR;

FIGS. 8A to 8D are diagrams explaining examples of the configurations of an oMOR, an oPCR, an iMPR, and an iPCR;

FIG. 11 is a diagram explaining an example of a data format of the descriptor;

FIG. 12 is a diagram explaining an example of a generation ID in FIG. 11;

FIG. 13 is a diagram explaining an example of a list ID in FIG. 11;

FIG. 18 is a schematic diagram showing connection setting conditions among a node, a subunit, a function block;

FIG. 23 is a schematic diagram showing the example of information about the audio subunit.

DETAILED DESCRIPTION

Preferred embodiments of this invention will be described with reference to the accompanying drawings:

(1) Summary of Control System

Figure 1:
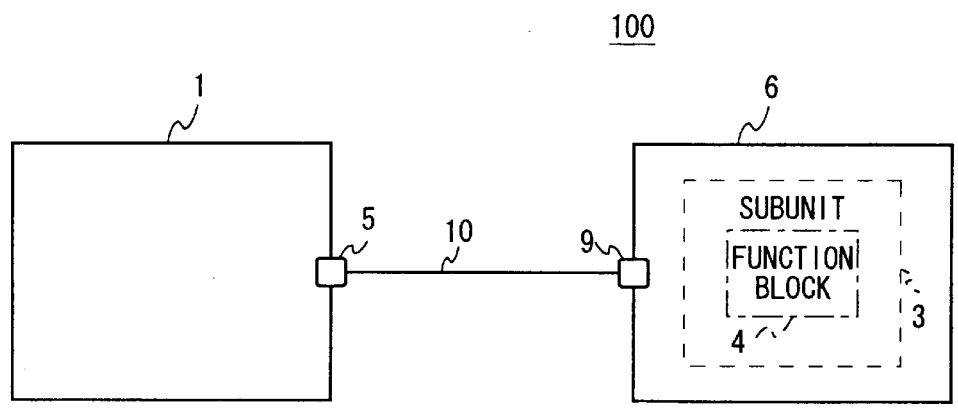
FIG. 1 is a block diagram showing the conception of a control system in the present invention.

FIG. 1 shows a outline of a control system in which a unit 1 and a unit 6 are connected to each other with a high performance serial bus of the Institute of Electrical and Electronics Engineers (IEEE) 1394 system (hereinafter, the high performance serial bus is referred to as an IEEE1394 bus) 10, to transmit predetermined data.

In FIG. 1, the units 1 and 6 logically shows aggregates of physically existing devices, and the unit 6 has at least one kind of a subunit 3 which executes logical functions of the devices, in the unit 6. This subunit 3 is conceptually subordinated to the unit 6. The subunit 3 has at least one kind of a function block which is conceptually subordinated to the subunit to represent the logical functions of the devices as a part.

As described above, the unit 1, the unit 6, and the subunit 3 conceptually include physical hardware and functional software of the device. Further, the function block 4 can be composed of only functional software such as programs.

In this connection, the unit I also may have subunits and function units. Further, in the control system 100, a plurality of units (devices), other than the units 1 and 6, can be connected.

Provided in the unit 1 is an IEEE1394 interface 5 which is an input/output interface under the IEEE1394 system, and data transmission is performed through the IEEE1394 bus 10 which is connected to the interface 5. Further, provided in the unit 6 is an IEEE1394 interface 9 which is an input/output interface under the IEEE1394 system, and data transmission is performed through the IEEE1394 bus 10 which is connected to the interface 9.

In the case of performing the data transmission through the IEEE1394 bus, an isochronous transmission mode which is used for transmitting relatively large amount of audio data as stream data at real time, and an asynchronous mode which is used for transmitting still pictures and control commands without fail are prepared, and a dedicated band is used for each mode.

Here, the IEEE1394 bus interface which connects the unit 1 to the unit 6 in FIG. 1 will be described.

Figure 2:
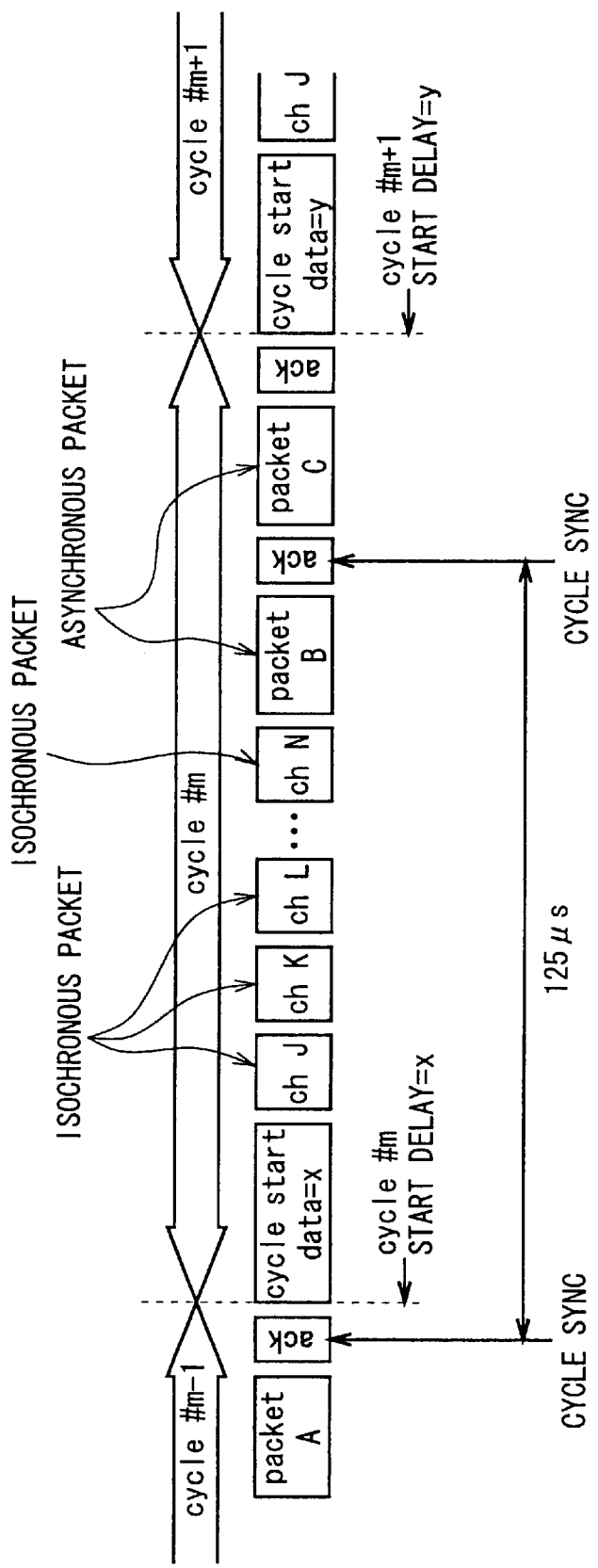
FIG. 2 is a diagram explaining an example of a cycle structure of data transmission with a bus of the IEEE1394 system.

FIG. 2 is a diagram showing a cycle structure for data transmission by a device connected with the IEEE1394. In the IEEE1394, data is divided into packets and transmitted with a cycle of 125.S as a standard, in time-division. This cycle is decided by a cycle start signal which is supplied from a node (any of devices connected to the bus) having a cycle master function. Isochronous packets keep bands (which are considered in a unit of time but referred to as bands) which are required for transmission, from the beginnings of all cycles. Therefore, data transmission for a fixed period of time is secured in the isochronous transmission. However, in the case where transmission errors occur, data is failed because the data is not protected. In the asynchronous transmission in which a node which has secured a bus as a result of arbitration while the bus is not used in the isochronous transmission for each cycle, transmits asynchronous packets, secure transmission is performed by using acknowledge and retry, however, timing of transmission is not fixed.

In the case where predetermined nodes perform the isochronous transmission, the nodes have to correspond to the isochronous function. In addition, at least one out of the nodes corresponding to the isochronous function has to have the cycle master function. Furthermore, at least one out of the nodes (that is, the unit 1 or the unit 6) connected to the IEEE1394 bus 10 has to have the isochronous resource manager function.

Figure 3:
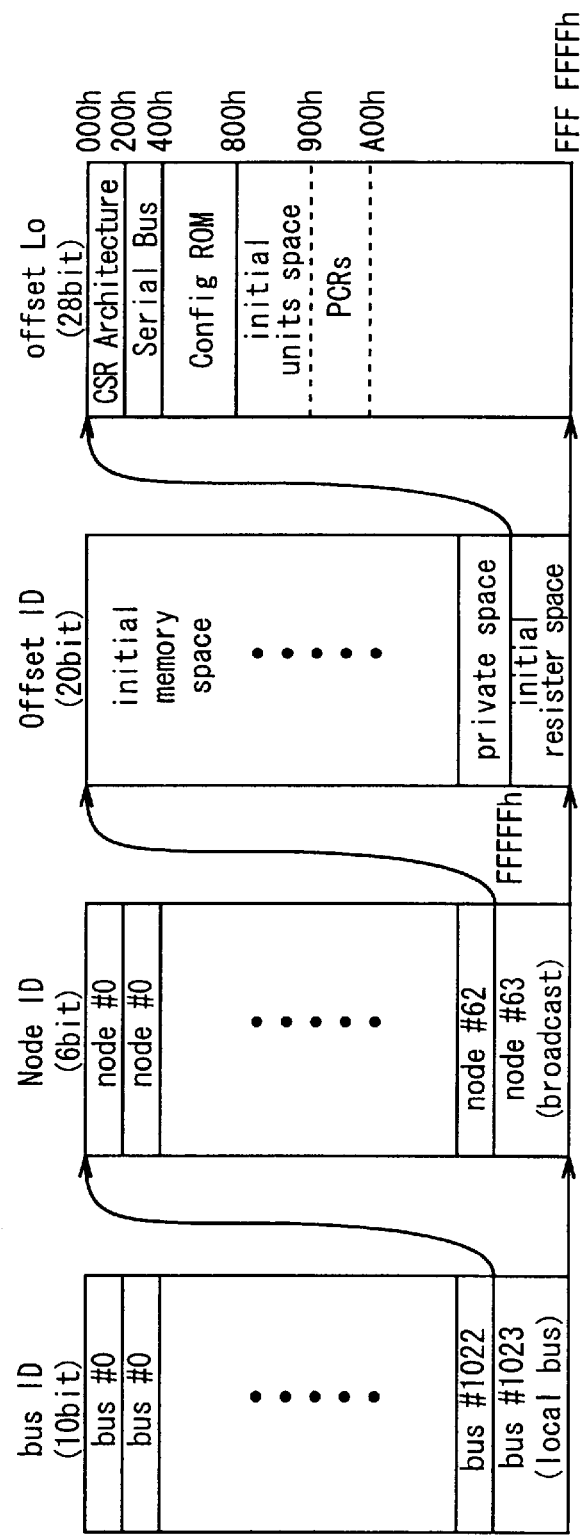
FIG. 3 is a diagram explaining a structural example of an address space of a CRS architecture possessed by 1394 nodes.

The IEEE1394 is based on a control and status register (CSR) architecture having address space of 64 bits under the ISO/IEC 13213 standard. FIG. 3 is a diagram explaining a structure in the address space of the CSR architecture. The upper 16 bits are node IDs showing the nodes under the IEEE1394, the rest 48 bits are used for designating the address space which is allotted to each node. The upper 16 bits are further divided into 10 bits for bus IDs and 6 bits for physical IDs (node IDs in narrow sense). Since a value in which all bits become to be 1 is used for a special purpose, 1023 buses and 63 nodes can be designated.

In the address space of 256 tera-bytes designated by the lower 48 bits, the space designated by the upper 20 bits is divided into an initial register space which is used for a special register for the CSR of 2048 bytes and a special register for the IEEE1394, a private space, and an initial memory space. In the case where space designated by the upper 20 bits is the initial register space, space designated by the lower 28 bits is used as a configuration read only memory (ROM), an initial unit space which is used for special purpose of nodes, plug control registers (PCRs) and so on.

FIG. 4 is a diagram explaining the offset addresses, names, and operations of the main CSR. The offset in FIG. 4 shows offset addresses from the number FFFFF0000000h (the numeral having h attached in the end is expressed by the hexadecimal notation) at which the initial register space starts. A bandwidth available register having the offset 200h shows bands capable of being used for the isochronous transmission, and only a value of a node driving as an isochronous resource manager is effective. That is, the CSR in FIG. 3 is held by each node, however, only a node as the isochronous resource manager is effective for the band width available register. In other words, only isochronous resource manager actually has the band width available register. The band width available register holds the maximum value in the case where the bands are not allotted in the isochronous communication, and the value is reduced every time when a band is allotted.

In channels available register in the offset 224h to 228h, each bit corresponds to the channel number of 0 to 63, and when the bit shows 0, this means that the channel has been already allotted. Only the channels available register of a node driving as the isochronous manager is effective.

Figure 5:
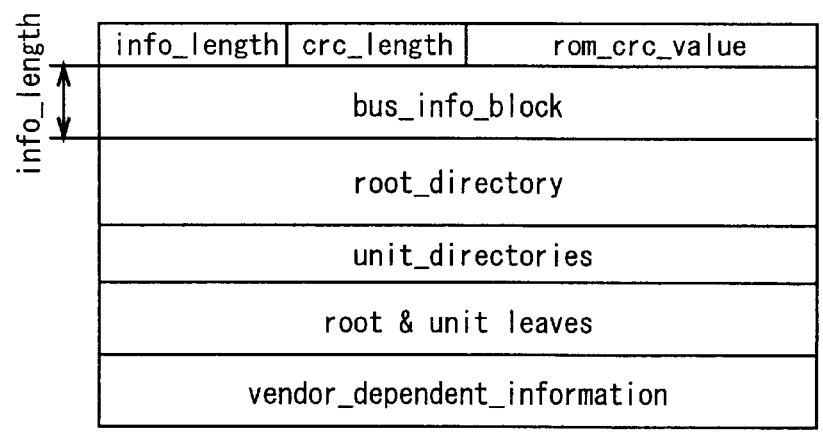
FIG. 5 is a diagram explaining an example of a general ROM format.

Back in FIG. 3, the configuration read only memory (ROM) based on the general ROM format is arranged in addresses 200h to 400h in the initial register space. FIG. 5 is a diagram explaining the general ROM format. A node which is a unit of access under the IEEE1394 can have a plurality of units which independently moves while using address space in common in the node. A unit_directories can shows a version of software and a position of the unit. Positions of a bus_info_block and a root_directory are fixed, however, positions of other blocks are designated by the offset address.

FIG. 6 is a diagram showing the bus_info_block, the root_directory and the unit_directory in detail. An ID number indicating the manufacturer of a device is stored in a Company_ID in the bus_info_block. An ID which is unique to the device and is the only one in the world is stored in a Chip_ID. Under the IEC61833 standard, 00h is written in a first octet in a unit_spec_ID of the unit directory of a device satisfying the IEC 61883; Aoh in a second octet; and 2Dh in a third octet. Further, 01h is written in a first octet in a unit switch version (unit_sw_version); and 1 in Least Significant Bit (LSB) of the third octet.

A node has a plug control register (PCR) standardized by the IEC61883, in addresses 900h to 9FFh in the initial unit space shown in FIG. 3, in order to control input/output of devices through an interface. This is a substantization of a conception of a plug, to form a signal path which is logically similar to an analog interface. FIG. 7 is a diagram explaining the configuration of the PCR. The PCR has a output plug control registers (oPCRs) representing an output plug and an input plug control registers (iPCRs) representing an input plug. In addition, the PCR has an output master plug register (oMPR) and an input master plug register (iMPR) which represent information on the output plug and the input plug unique to each device. Each device does not have a plurality of oMPRs and iMPRs which correspond to respective plugs, however, it is possible to have a plurality of oPCRs and iPCRs dependently on efficiency of the device. The PCR shown in FIG. 7 has 31 pieces of oPCRs and 31 pieces of iPCRs. The path of isochronous data is controlled by controlling a register corresponding to these plugs.

FIGS. 8A to 8D are diagrams showing the configurations of the oMPR, the oPCR, the iMPR, and the iPCR. FIG. 8A, FIG. 8B, FIG. 8C, and FIG. 8D show the configurations of the oMPR, the oPCR, the iMPR, and the iPCR, respectively. Stored in data rate capability of 2 bits on the MSB side of each of the oMPR and the iMPR is a code indicating the maximum transmission speed of isochronous data which the device can transmit or receive. A broadcast channel base of the oMPR defines the number of a channel to be used for broadcast output.

A number of output plugs of 5 bits on the LSB side of the oMPR stores a value showing the number of output plugs in the device, that is, the number of oPCRs. A number of input plugs of 5 bits on the LSB side of iMPR stores a value showing the number of input plugs in the device, that is, the number of iPCRs. A non-persistent extension field and a persistent extension field are areas which are defined for the future extension.

On_line (on-line) on the MSB side of each of the oPCR and the iPCR shows use conditions of a plug. That is, when the value is 1, the plug is ON-LINE, and when the value is 0, the plug is OFF-LINE. The value in broadcast connection counter in each of the oPCR and the iPCR shows the presence (1) or absence (0) of the broadcast connection. The value in point-to-point connection counter of 6 bits in each of the oPCR and the iPCR shows the number of point-to-point connections in the plug.

The value in channel number of 6 bits in each of the oPCR and the iPCR shows the number of isochronous channels to which the plug is connected. The value in a data rate of 2 bits in the oPCR shows the actual transmission speed of packets for isochronous data which is output from the plug. A code stored in an overhead ID of 4 bits in the oPCR shows the band width of the over in the isochronous communication. The value in a pay load of 10 bit width in the oPCR shows the maximum value of data which is included in the isochronous packets which the plug can accept.

Figure 9:
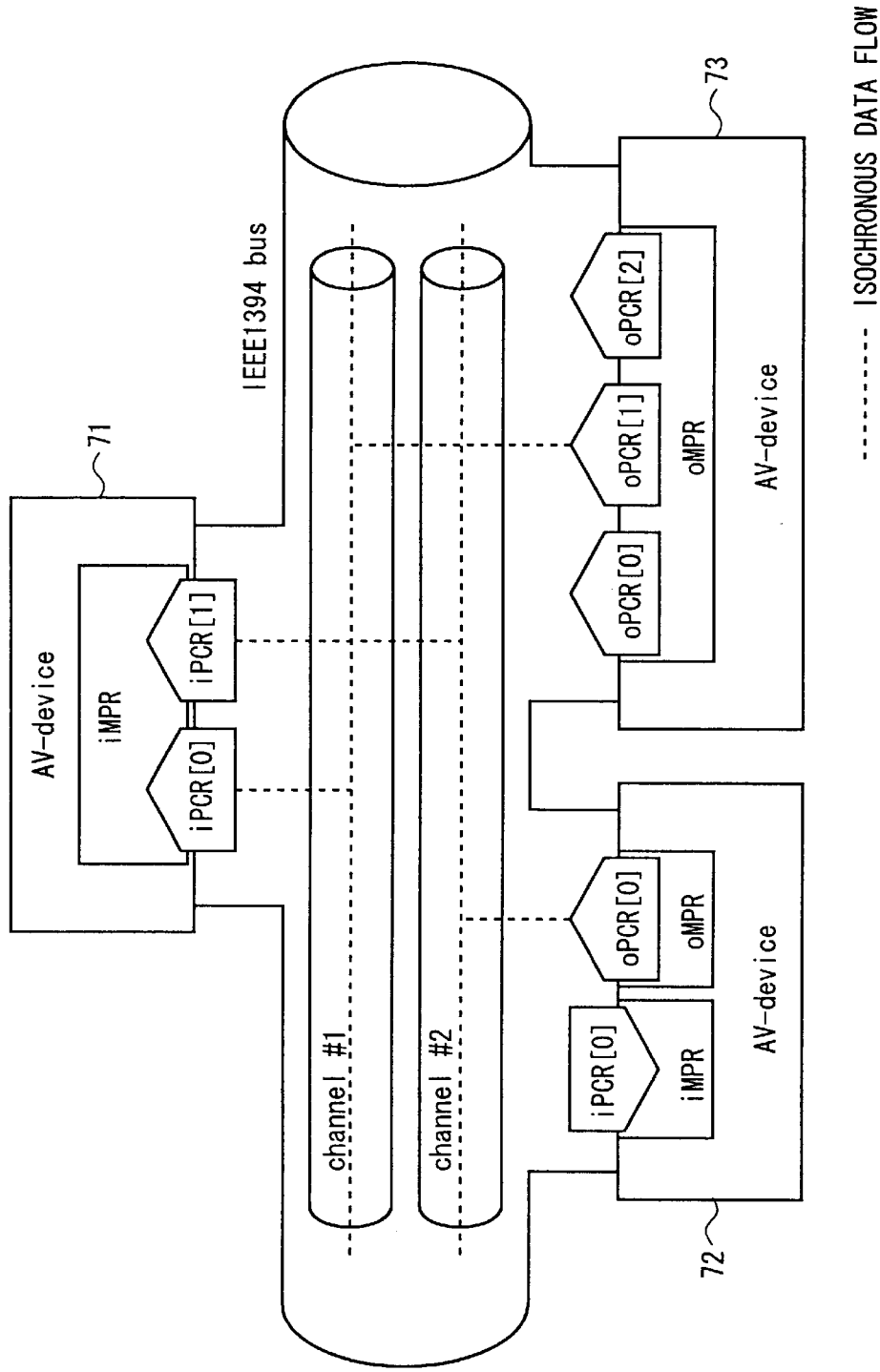
FIG. 9 is a diagram explaining an example of the relationship among a plug, a plug control register, and a transmission channel.

FIG. 9 is a diagram showing the relationship among the plug, the plug control register, and the isochronous channel. In this figure, three AV devices (AV_devices) 71 to 73 are connected with the IEEE1394 serial bus. The isochronous data for which a channel is designated by the oPCR [1], out of the oPCR [0] to oPCR [2] in which the transmission speed and the number of oPCRs are defined by the oMPR of the AV device 73, is transmitted to the channel #1 of the IEEE1394 serial bus. The AV device 71 reads the isochronous data, which is transmitted through the channel #1 in the IEEE1394 serial bus, by using the input channel #1 and at the transmission speed which are designated by iPCR [0], out of the iPCR [0] and the iPCR [1] in which the transmission speed and the number of iPCRs are defined by the iMPR of the AV device 71. Similarly to this, the AV device 72 transmits the isochronous data to the channel #2 designated by the oPCR [0] and the AV device 71 reads the isochronous data from the channel #2 designated by the iPCR [1].

As described above, data transmission is performed between the devices connected to each other with the IEEE1394 serial bus. And in the control system in this embodiment, controlling and condition judgment of each device is performed, by using the AV/C command set which is defined as a command to control the devices connected with the IEEE1394 serial bus. Next, this AV/C command set will be described.

Figure 10:
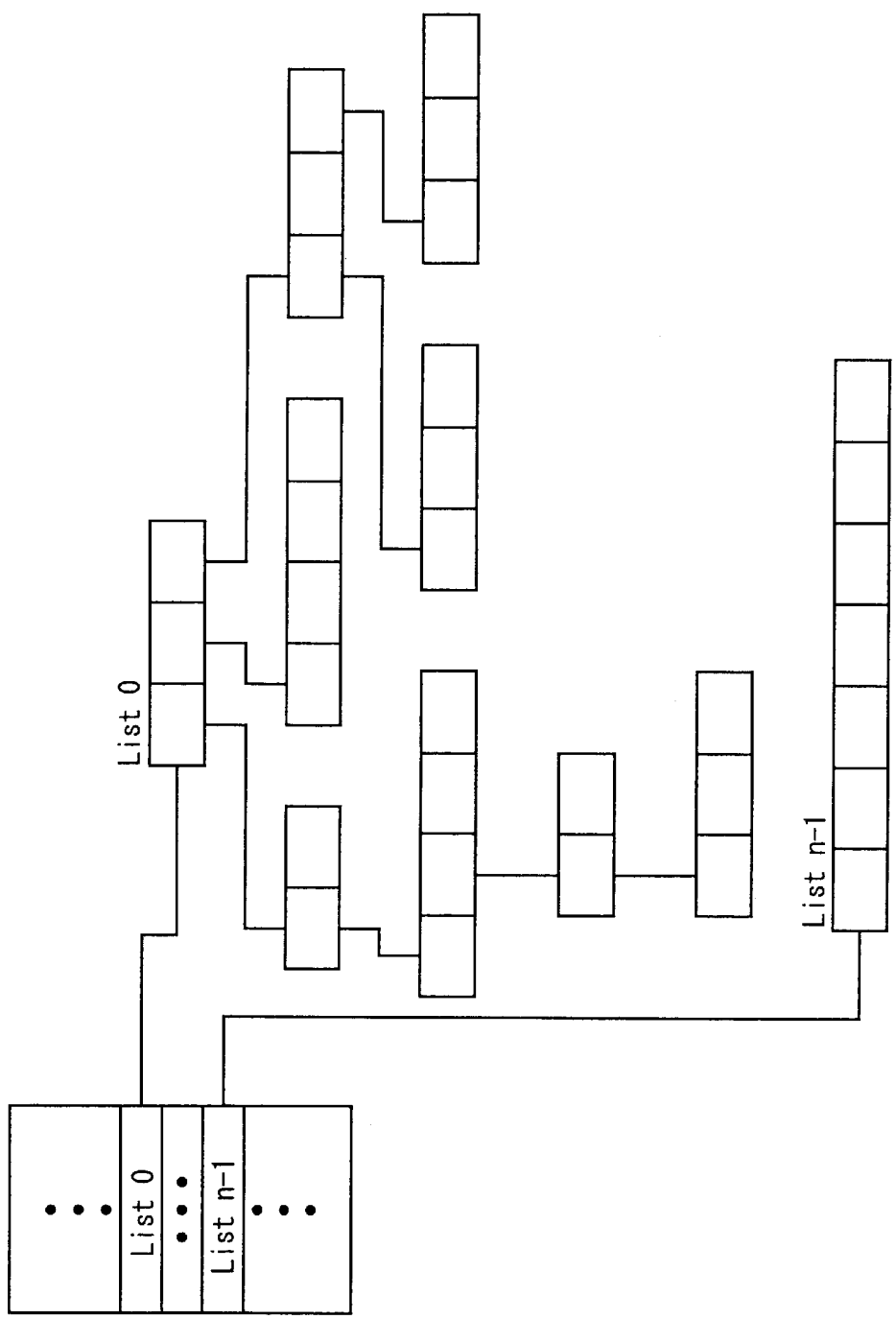
FIG. 10 is a diagram explaining an example of data structure in a descriptor hierarchical model.

Firstly, the data structure of a Subunit Identifier Descriptor in the AV/C command set which is used in this system will be described in reference with FIG. 10 to FIG. 13. FIG. 10 shows the data structure of the Subunit Identifier Descriptor. As shown in FIG. 10, the Subunit Identifier Descriptor is formed by a list of hierarchical structure. The list represents, for example, receivable channels in a tuner, or recorded tunes in a disc. A list in the highest-ranked layer of the hierarchical structure is called a root list, and is a root, for example, of a list 0 toward lower-ranked lists. Lists 2 to (n−1) are similarly called root lists. The number of root lists is equivalent of that of objects. Here, in the case where the AV device is a tuner, the object means each channel in digital broadcasting. Further, all lists in one layer have common information.

FIG. 11 shows a format of the General Subunit Identifier Descriptor which is used in the existing system. Attribute information related to functions is written in the contents in the Subunit Identifier Descriptor 41. The value of the descriptor length field itself is not included. A "generation ID" shows a version of the AV/C command set, and the value of this time is "00h" (h means hexadecimal) as shown in FIG. 12. Here, the "00h" means that the data structure and the command are in the version 3.0 of the AV/C General Specification. Further, as shown in FIG. 12, all values other than "00h" are reserved for future specification.

A size of list ID shows the number of bytes of the list ID. A size of object ID shows the number of bytes of the object ID. During controlling, a size of object position shows a position (the number of bytes) in the list which is used for reference. A number of root object lists shows the number of root object lists. A "root object list ID" shows ID for identifying independent root object lists in the higher-ranked layer.

A subunit dependent length shows the number of bytes in the following subunit dependent information field. The subunit dependent information is a field representing information unique to a function. A manufacturer dependent length shows the number of bytes in the following manufacturer dependent information field. The manufacturer dependent information is a field showing specification information of a vender (maker). Note that, when the manufacturer dependent information is not written in the descriptor, this field does not exist.

FIG. 13 shows assignment ranges for the list IDs shown in FIG. 11. As shown in FIG. 13, the "0000h to 0FFFh" and "4000h to FFFFh" are reserved as assignment ranges for future specification. "1000h to 3FFFh" and "10000h to max list ID value" are prepared for identifying dependent information of function type.

Figure 14:
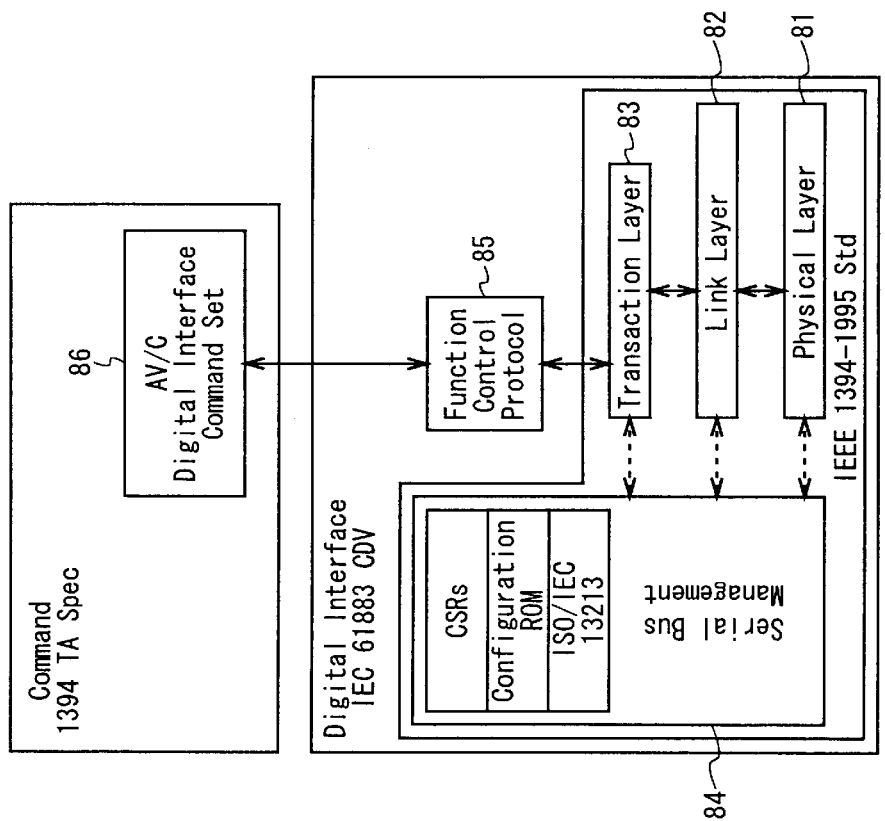
FIG. 14 is a diagram explaining an example of a stack model of an AV/C command.

Next, the AV/C command set which is used in a system in this embodiment will be described in reference with FIG. 14 to FIG. 19. FIG. 14 shows a stack model of the AV/C command set. As show in FIG. 14, a physical layer 81, a link layer 82, a transaction layer 83, and a serial bus management 84 are based on the IEEE1394. A function control protocol (FCP) 85 is based on the IEC61883. And the AV/C command set 86 is based on the 1394TA spec.

Figure 15:
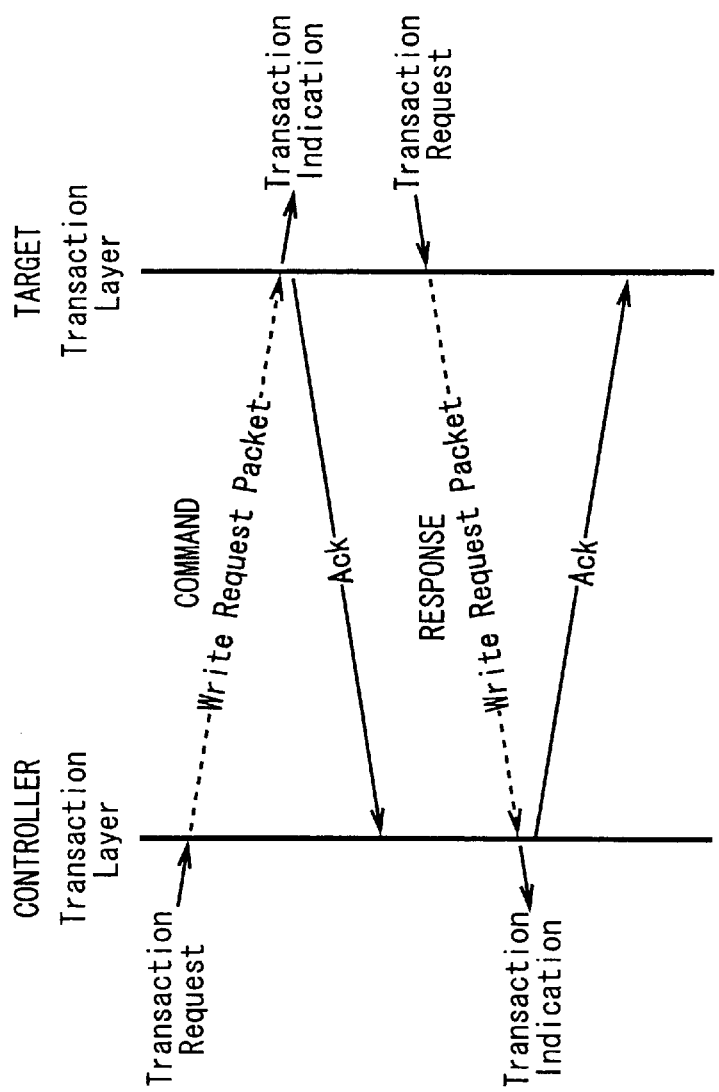
FIG. 15 is a diagram explaining the relationship between a command and a response in a FCP.
Figure 16:
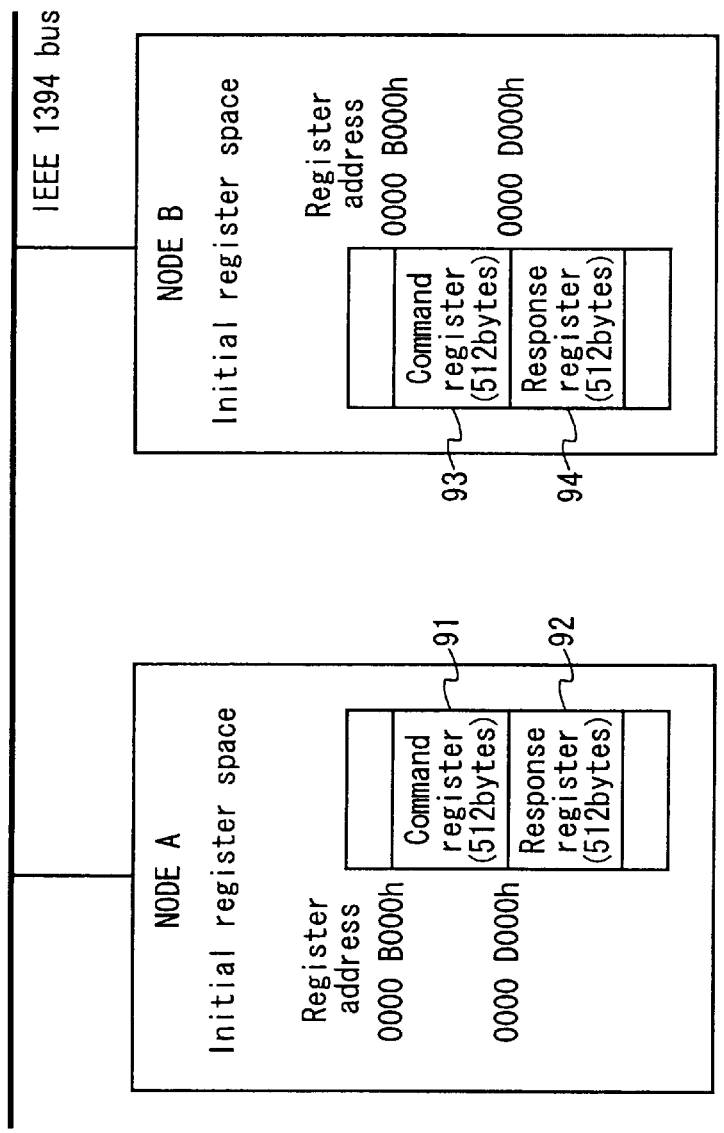
FIG. 16 is a diagram explaining the relationship between the command and the response in the FCP shown in FIG. 15, in more detail.

FIG. 15 explains a command and a response in the FCP 85 shown in FIG. 16. FCP is a protocol for controlling AV devices under the IEEE1394. As shown in FIG. 15, the control side is a controller and a side to be controlled is a target. The transmission and the response of the command in the FCP are performed between the nodes, by using the write transaction in the asynchronous communication under the IEEE1394. The target which receives data, sends "acknowledge" to the controller for reception confirmation.

FIG. 16 explains the relationship between the command and the response in the FCP shown in FIG. 15, in more detail. A node A and a node B are connected to each other with the IEEE1394 bus. The node A is a controller and the node B is a target. A command register of 512 bytes and a response command of 512 bytes are prepared in the node A and the node B. As shown in FIG. 16, the controller writes a message in the command register 93 of the target to make a notice of an order. On the contrary, the target writes a response message in the response register 92 of the controller for response. As described above, control information is transmitted/received for two messages. A kind of command set which is transmitted by the FCP is written in the CTS in the data field shown in FIG. 17 which will be described later.

In the control system 100, in the case of performing data transmission through the IEEE1394 but 10, any of devices (the units 1 and 6) connected to each other with the IEEE1394 bus 10 can be used as a controller for controlling the units.

That is, in the of taking the unit 1 as the controller, the unit (controller) 1 transmits a control command to the unit 4 with a dedicated band in the asynchronous mode according to necessity, and receives a response to the control command, which has been transmitted to the unit 4, and thereby controlling the unit 4.

Figure 17:
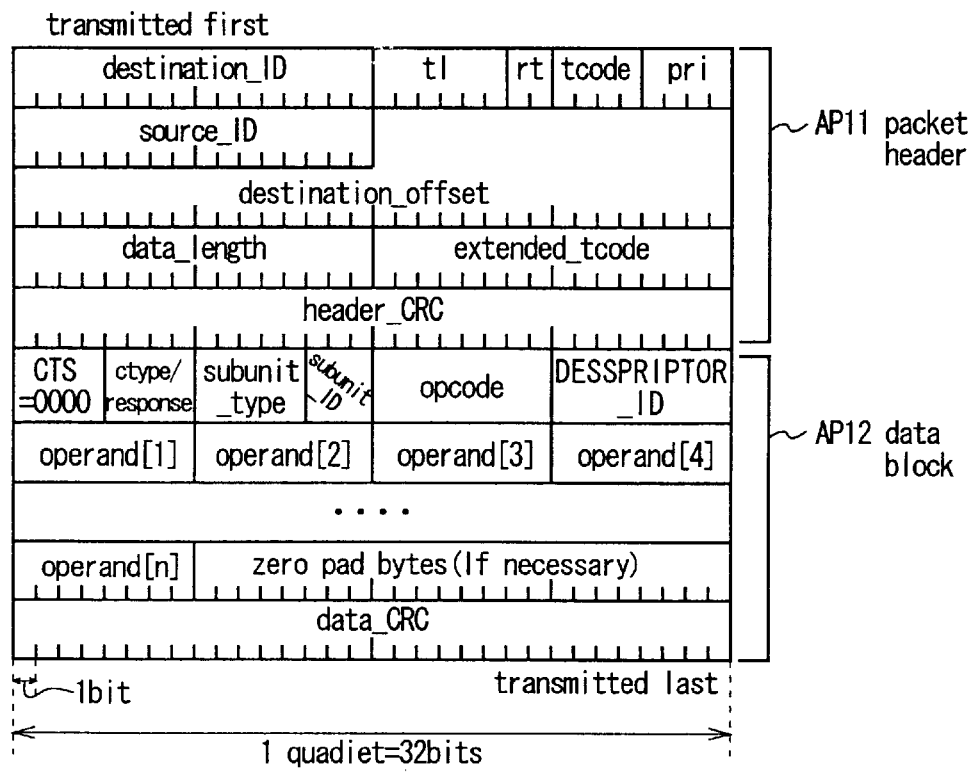
FIG. 17 is a schematic diagram showing a format of a control protocol.

As to a protocol format in transmitting/receiving this control command, transmission/reception is performed with one quadiet=thirty-two bits as one unit (a packet), as shown in FIG. 17.

In the packet, the upper section of the figure shows a packet header AP11, a destination ID (destination_ID) in the packet header AP11 shows an address of a destination unit, and a source ID (Source_ID) shows an address of a sender unit.

In addition, the lower section shows a data block AP12, a command transation set (CTS) which consists of four bits, in the data block AP12, identifies methods of transmitting the control command and the response, and CTS=0000 is an audio video/control (AV/C) command set.

In the AV/C command set, a ctype/response which consists of four bits, in the data block, is a code for defining the identification of the control commands and the responses and the types of the control commands and the responses.

Further, a subunit type (subunit_type) consists of five bits, in the data block, shows an address of subunits which are installed in a designation unit designated by the destination ID.

Further, a subunit ID (subunit_ID) which consists of three bits, in the data block, is used for identification in the case where a plurality of subunits are installed in a unit. That is, in the case where three kinds of identical subunits are installed in a unit, the subunit ID is an identifier to allow each unit to identify which kind of subunit is to be used.

Further, an opcode shows codes of a control command and a response to the control command. Furthermore, an operand is a modifier of a control command and a response to the control command, and is defined for each opcode, which is used for a control command and a response to the control command, and each kind has a different area in the operand.

Concretely, for example, an OPEN DESCRIPTOR command for acquiring the access right to memory space which is referred to as an identifier descriptor of a designation subunit, which is designated by the subunit type, a READ DESCRIPTOR command for reading out a configuration ID (Configuration_ID) from memory space which is referred to as an identifier descriptor, and so on are allotted to the opcode.

In addition, when the OPEN DESCRIPTOR command is allotted to the opcode, a desired descriptor ID and the like are allotted to the operand, and when the READ DESCRIPTOR command is allotted to the opcode, a desired descriptor ID, subunit information and the like are allotted to the operand.

The descriptor ID is an address for specifying memory space which is referred to as an identifier descriptor existing in each subunit.

The subunit information consists of a configuration ID and the like, and the configuration ID is definite information which consist of information representing contents of a unit of function blocks in the subunit, or a unit of combined function blocks in the case where there is a plurality of function blocks, and information representing amount of control for control items (control contents) which is controlled by the unit. The configuration ID is defined by a configuration ID [1], a configuration ID [2], . . . , a configuration ID [p], for each unit in a form of numbers, for example, and is stored in the identifier descriptor for each subunit.

Therefore, in the control system 100, a control command and a response to the control command for a unit and a subunit are transmitted through the IEEE1394 bus with the AV/C command.

Here, for example, in the case where the unit (controller) 1 controls the unit 4, the unit (controller) 1 transmits a control command in which the OPEN DESCRIPTOR is allotted to the opcode and the descriptor ID and the like are allotted to the operand, to the unit 4.

When receiving the control command supplied from the unit (controller) 1, the unit 4 transmits a response indicating that the access to the identifier descriptor corresponding to the descriptor ID, which is allotted to the operand in the control command, is accepted, to the unit 1 through the IEEE1394 bus 10.

When receiving the response indicating that the access to the identifier descriptor corresponding to the descriptor ID, from the unit 4, the unit (controller) 1 transmits a control command in which the READ RESCRIPTOR command is allotted to the opcode and the descriptor ID which can get the access right in the unit 4 is allotted to the operand, to the unit 4 through the IEEE1394 bus 10

When receiving the control command given from the unit (controller) 1, the unit 4 reads out subunit information (configuration ID) from the identifier descriptor corresponding to the descriptor ID, which is allotted to the operand, allots this information to the operand and transmits this as a response to the unit 1 through the IEEE1394 bus 10.

The unit (controller) 1 previously stores corresponding definite information corresponding to each number of configuration ID, which is stored in the identifier descriptor in each subunit connected to the IEEE1394 bus 10. And, the unit (controller) 1 which has received a response to the READ DESCRIPTOR command from the unit 4, can know about functions of a subunit in the unit 4, possible function setting, and its setting limits, only by knowing the number of the configuration ID allotted to the operand of the received response.

Thereby, the unit (controller) 1 controls the unit 4 on the basis of the configuration ID.

In this way, in the control system, 100, a controller (unit 1) transmits a control command for a unit and a subunit and the response to the control command, through the IEEE1394 bus 10, to control a device (unit 4) connected to the IEEE1394 bus 10, and on the basis of the control, data transmission is performed between devices connected to each other with a bus.

FIG. 18 shows a connection setting condition among a unit, a subunit, and a function block in the data transmission, and serial bus plugs 11 and 16, subunit plugs 12 and 15, and function block plugs 13 and 14 are used as logical plugs.

The serial bus plugs 11 and 16 show an entrance and an exit for signals through the IEEE1394 bus in the unit. In addition, the subunit plugs 12 and 15 show an entrance and an exit for signals through a bus in the subunit and is considered as plugs which are conceptually subordinate to the serial bus plugs 11 and 16. Furthermore, the function block plugs 13 and 14 show an entrance and an exit for signals through a bus in the function block and is considered as plugs which are conceptually subordinate to the subunit plugs 12 and 15. In this connection, in FIG. 18, conveniently, the left side of each block is the entrance plug (the serial bus plug 11, the subunit plug 12 and the function block plug 13) and the right side of each block is the exit plug (the serial bus plug 16, the subunit plug 15, and the function block plug 14).

In this case, data transmitted through the IEEE1394 bus is input to the serial bus plug 11 for entrance. After data, which is input to the serial bus plug 11, is subjected to preprocessing (such as securing a dedicated band for each transmission mode), if necessary, in the unit, the data is distributed in the subunit plug 12 for entrance in each of subunits which have to receive the data. Thereby, the subunit, the unit and the serial bus plug 11 are logically connected.

Further, after the data, which is input to the subunit, is subjected to processing, if necessary, in each subunit, the data is distributed in the function block plug 13 for entrance in each of function units which have to receive the data. Thereby, the function block, the subunit, and the subunit plug 12 are logically connected.

The function blocks are logically connected with the function block plug 14 for exit in the function block which outputs data, and the function block plug 13 for entrance in the function block which receives data. In the case where each function block outputs data, which has been subjected to various processing, to the subunit, the data is gathered in the subunit plug 15 for exit in the subunit. Furthermore, data which is output from the subunit plug 15 for exit in the subunit is output from the serial bus plug 16 for exit in the unit to outside (that is, to the IEEE1394 bus).

As described above, the logical connection is secured among the unit, the subunit and the function block, and data which is transmitted through the IEEE1394 bus, is input to the function block via the unit and the subunit, and is output from the function block via the subunit and the unit to the IEEE1394 bus.

In this way, the unit (controller) 1 can connect to another unit (unit 6) connected to the IEEE1394 bus, and can perform the data transmission to the unit.

(2) Configuration of Control System

Figure 19:
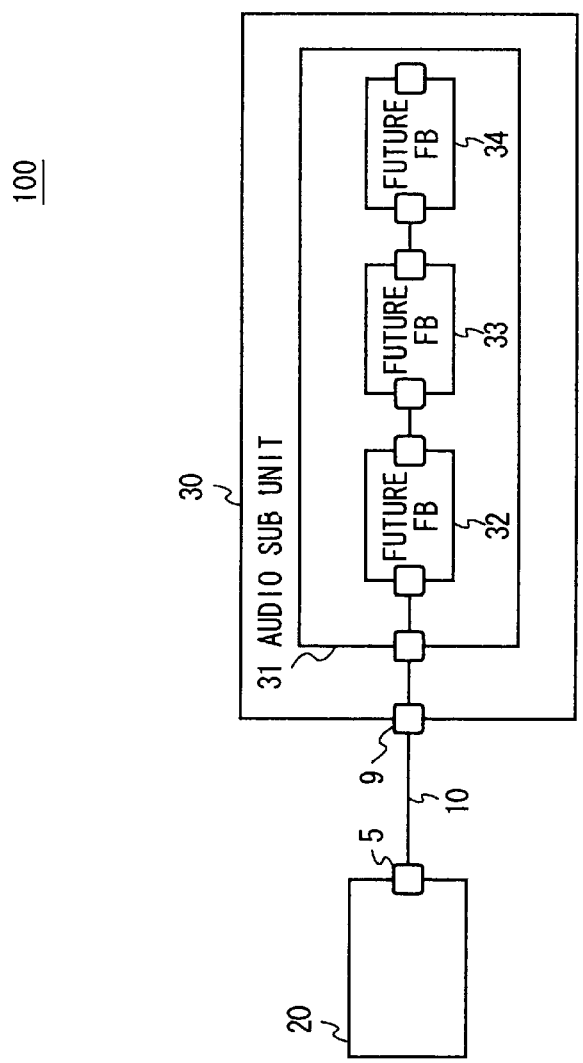
FIG. 19 is a block diagram showing the configuration of the control system in the present invention as a whole.

FIG. 19 in which the same reference numerals are applied to parts corresponding to those in FIG. 1 shows a control system, in which a personal computer 20 and an audio amplifier 30 as units are connected to each other with the IEEE1394 bus 10, and the personal computer 20 can set functions (equalizer function and so on) of the audio amplifier 30 with the AV/C command (control command) in detail.

Figure 20:
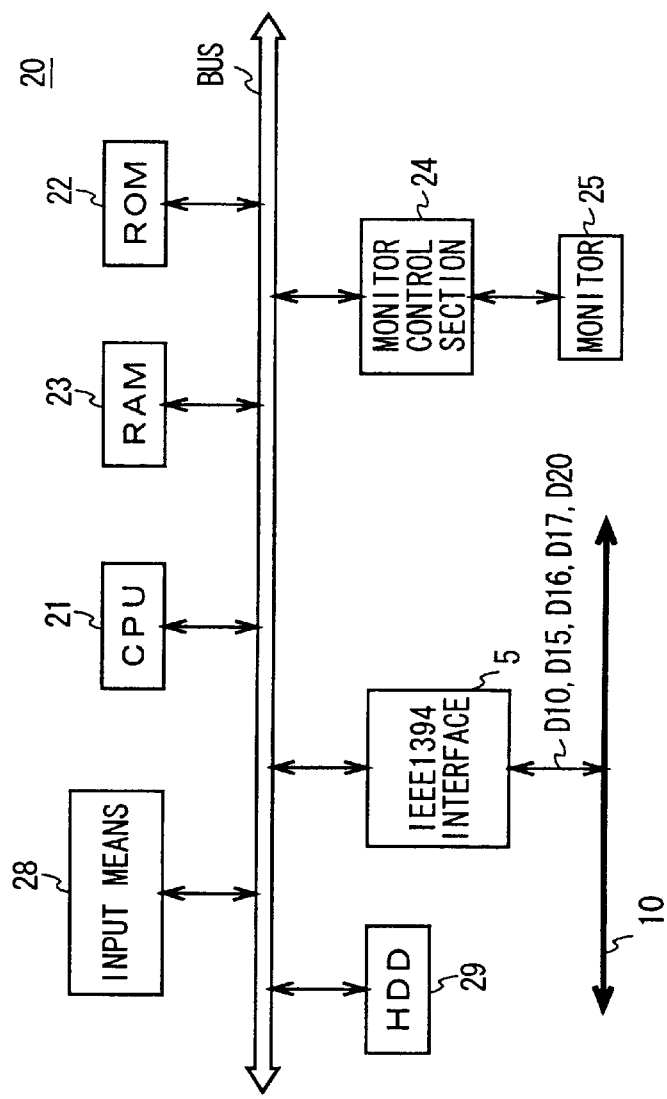
FIG. 20 is a block diagram showing the configuration of a personal computer.

The personal computer 20 has a configuration shown in FIG. 20, in which a CPU 21, a ROM 22, a RAM 23 and other circuits are connected with a bus BUS. The personal computer 20 is driven in accordance with processing programs in such a manner that the programs stored in the ROM 22 is executed by the RAM 23. As described above, the CPU 21 makes the RAM 23 read the various programs stored in the hard disk drive 29 if necessary, to execute various processing in accordance with the read program, and controls each circuit in accordance with the processing. The contents of the various processing is shown on a monitor 25 such as a liquid crystal display, via a monitor control section 24.

Further, the personal computer 20 is a controller which can control the audio amplifier 30 by generating a control command on the basis of information stored in the hard disk drive 29, and outputting the command to the audio amplifier 30.

The hard disk drive 29 stores information (corresponding definite information corresponding to the contents written in each number of the configuration ID which is definite information, or the like) which is necessary for controlling the audio amplifier 30, which is connected with the IEEE1394 bus 10, and updates the information when a new device is connected with the IEEE1394 bus 10.

Figure 21:
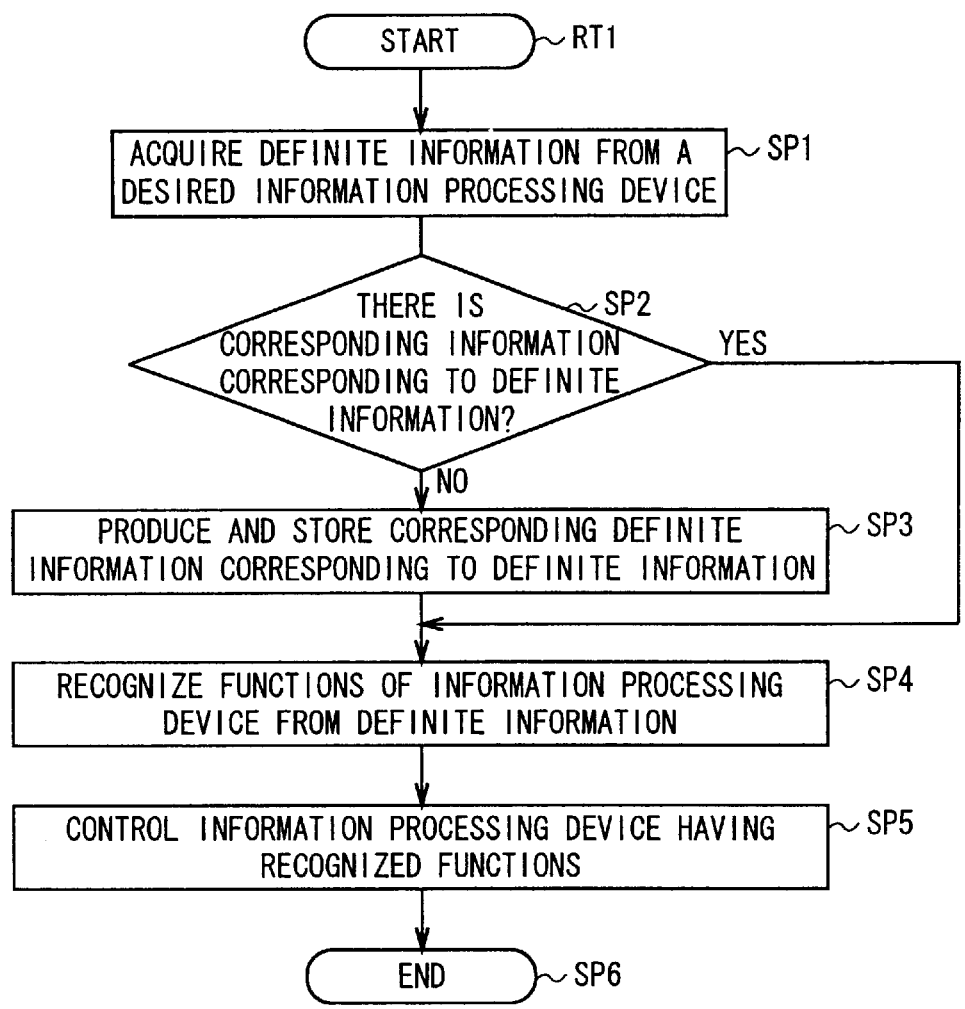
FIG. 21 is a flow chart showing a control processing procedure.

Here, in the personal computer 20, the user performs a predetermined input operation of, for example, changing of frequency characteristics in the equalizer of the audio amplifier 30, with an input means 28 such as a mouse and key board, the CPU 21 of the personal computer 20 executes a control processing procedure RT1 shown in FIG. 21 to generate the control command D10, which has been described in FIG. 17, using the information, which is stored in the hard disk drive 29, on the basis of the input operation by the user and to output the command D10 to the IEEE1394 interface 5.

In this connection, the OPEN DESCRIPTOR is allotted to the opcode (FIG. 17) of the control command D10, and the descriptor ID and the like for the audio subunit 31 (FIG. 19) of the audio amplifier 30 are allotted to the operand (FIG. 17).

The IEEE1394 interface 5 is connected to the audio amplifier 30, as described in FIG. 18, with the dedicated band in the asynchronous transmission mode, on the basis of the control command, and the control command is output to the audio amplifier 30 (FIG. 19) through the IEEE1394 bus 10.

Figure 22:
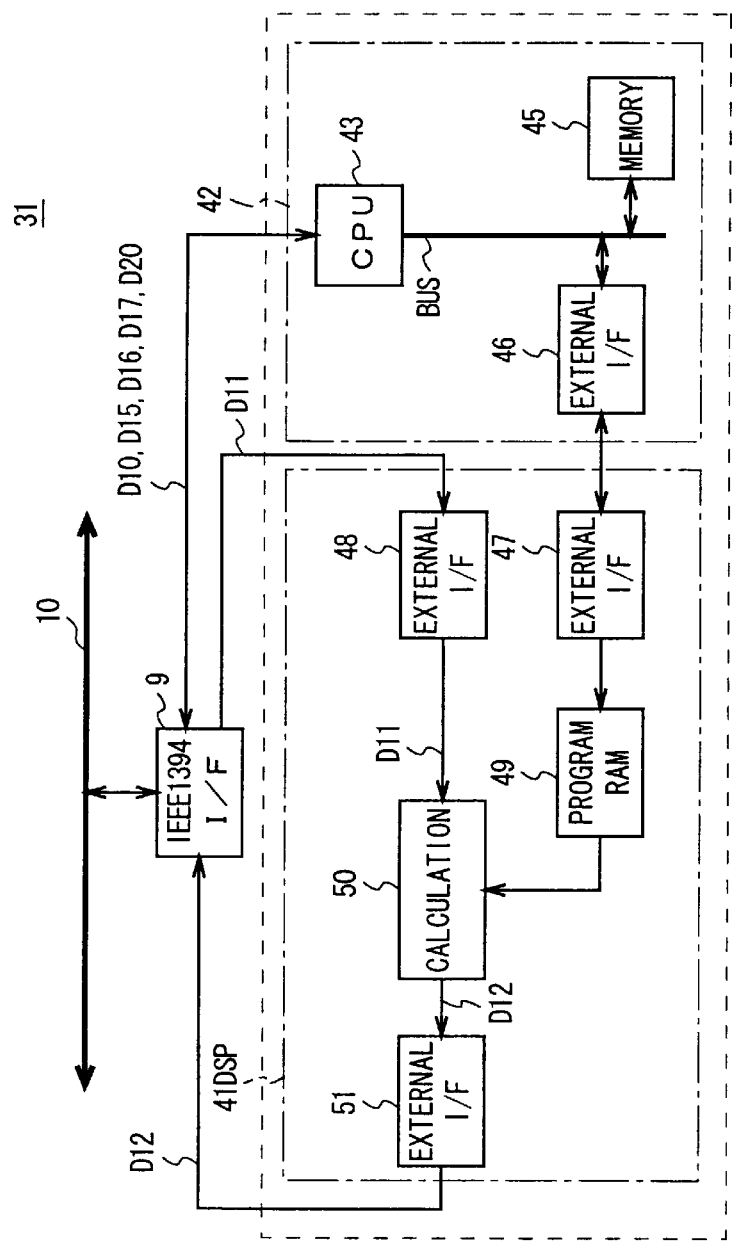
FIG. 22 is a block diagram showing the configuration of the subunit.

The audio subunit 31 of the audio amplifier 30 is composed of a digital signal processor (DSP) 41 and a microcomputer 42, as shown in FIG. 22, and the microcomputer 42 controls the DSP 41 to execute various processing.

In this case, the IEEE1394 interface 9 provided in the audio amplifier 30 outputs the control command D10 supplied through the IEEE1394 bus 10, to the microcomputer 42 in the audio subunit 31. In this connection, the IEEE1394 interface unit 9, when receiving audio data as stream data D11 through the IEEE1394 bus 10, outputs this to the DSP 41 in the audio subunit 31.

The microcomputer 42 has a CPU 43, a memory which stores programs for future function blocks 32, 33, 34 (FIG. 19), and an external interface (external I/F) 46, which are connected with a data bus. The CPU 43 sends a response of accepting the access right to the identifier descriptor corresponding to the descriptor ID allotted to the operand (FIG. 17) in the control command D10, which has been supplied via the IEE1394 interface 9, to the personal computer 20 through the IEEE1394 bus 10 as a response D15 (FIG. 19).

The CPU 21 (FIG. 20) of the personal computer 20, receiving the response D15 via the IEEE1394 interface 5, transmits again to the audio amplifier 30, a control command D16 in which the READ DESCRIPTOR command is allotted to the opcode (FIG. 17) and the descriptor ID which obtains the access right to the audio amplifier 30 is allotted to the operand (FIG. 17) (FIG. 19).

The CPU 43 (FIG. 21) of the audio amplifier 30 reads out audio subunit information from the memory space of the identifier descriptor in the memory 45, on the basis of the descriptor ID allotted to the operand (FIG. 17) in the control command D16, which has been supplied via the IEEE1394 interface 9.

Here, FIG. 23 shows an example of the audio subunit information read out from the memory space of the identifier descriptor in the memory 45 on the basis of the descriptor ID. The left area in the figure shows offset addresses AP21, and the right area in the figure shows contents of each configuration ID ([1] to [p]) AP22.

The contents of configuration ID ([1] to [p]) consists of version information of audio subunit 31, the contents of the future function blocks 32, 33, 34 (FIG. 19), amount of control for the control items which are controlled by the future function blocks 32, 33, 34 (FIG. 19), and so on.

The CPU 43 of the audio amplifier 30 allots the subunit information to the operand in the control command D16, and outputs this as a response D17 to the personal computer 20 via the IEEE1394 interface 9 and the IEEE1394 bus 10 (FIG. 19).

The CPU 21 (FIG. 20) of the personal computer 20 receives the response D17, which has been supplied from the audio amplifier 30. In this way, the CPU 21 of the personal computer 20 acquire the definite information (configuration ID ([1] to [p])) about the specification of the audio subunit 31 in the audio amplifier 30 (functions, possible function setting, and setting limits) (FIG. 21: step SP1)

Further, the CPU 21 (FIG. 20), when receiving the response D17, judges which number includes the contents related to the change of the equalizer, which is input with the input means 28, out of the numbers of configuration ID in the audio subunit information, which are allotted to the operand of the response D17.

Then, the CPU 21 reads out the corresponding definite information corresponding to the configuration ID [1] in which the contents related to the change of the equalizer, which is input with the input means 28, from the hard disk drive 29.

Here, the personal computer 20 previously stores, in the hard disk drive 29, as the corresponding definite information corresponding to the configuration ID [1] defined by a graphic equalizer of the audio amplifier 30, for example, information for controlling the frequency characteristics (250 Hz, 500 Hz, 1 kHz, 4 kHz, 8 kHz) of the stream data (audio data), information for controlling audio channels (Left Front, Right Front, Center Front) for the stream data (audio data), limitation information for simultaneously controlling the audio channels for the stream data (audio data), limitation information about maximum reduction amount for the stream data (audio data), and the amplification amount and the damping amount for one step in the amplification and damping operations of the stream data (audio data) (FIG. 21: step SP2).

Thereby, the personal computer 20 recognizes the specification related to the equalizer in the audio subunit 31 (a kind of functions, possible function setting, and setting limits) on the basis of the corresponding definite information, only by knowing the number ([1]) of the configuration ID in the response to the control command, which is supplied from the audio subunit 31 (FIG. 21: step SP4).

Therefore, the personal computer 20 can omit analysis processing of recognizing functions related to equalizer in the audio subunit 31, by analyzing the configuration ID allotted to the operand (FIG. 17) in the transmitted response to the control command.

Further, if the personal computer 20 does not store, in the hard disk drive 29, corresponding definite information corresponding to the configuration ID [3], for example, out of the configuration IDs ([1] to [p]) allotted to the operand (FIG. 17) in the response to the control command, it produces the corresponding definite information corresponding to the configuration ID [3] (FIG. 21: step SP2).

In this case, the CPU 21 of the personal computer 20 produces and stores the corresponding definite information on the basis of the contents written in the configuration ID [3] allotted to the operand (FIG. 17) in the response to the control command (FIG. 21: step SP3).

Therefore, if the personal computer 20 to which a new unit is connected with the IEEE1394 bus 10 previously does not store corresponding definite information corresponding to the configuration ID of the connected unit in the hard disk drive 29, it stores the corresponding definite information in the hard disk drive 29. As a result, the hard disk drive 29 of the personal computer 20 always store the corresponding definite information corresponding to the configuration IDs stored in the identifier descriptors in all subunits which are connected with the IEEE1394 bus 10.

As described above, the personal computer 20 can know in detail the specifications of the units from the configuration ID in the subunit of a unit, even when any kind of unit is connected with the IEEE1394 bus 10.

Thereby, the personal computer 20 exactly controls a unit, using the corresponding definite information corresponding to the configuration ID which is detailed information about the subunit of the unit, which is connected with the IEEE1394 bus 10 (FIG. 21: step SP5).

Figure 24:
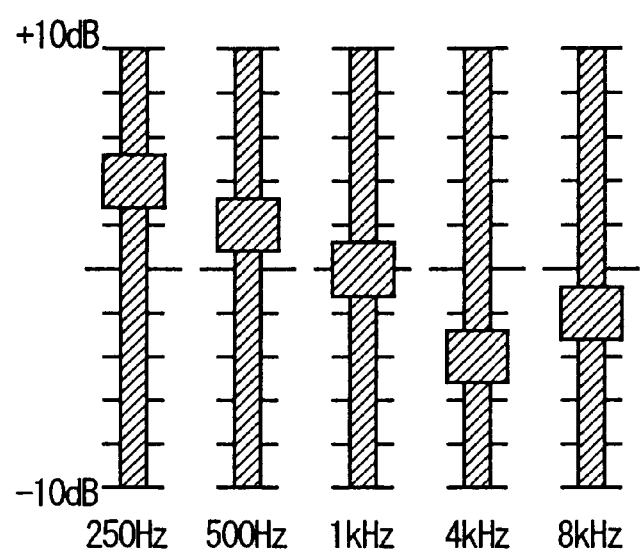
FIG. 24 is a schematic diagram showing the display example for changing frequency characteristics.

That is, under such a situation that the personal computer 20 receives the response D17 (FIG. 17) to the control command, which is supplied from the audio amplifier 30, the CPU 21 reads out corresponding definite information corresponding to the configuration ID [1] storing the contents related to the change of equalizer which has been input with the input means 28, out of the configuration IDs of the received response D17 to the control command, and displays a graphic screen for changing the frequency characteristics of the equalizer as shown in FIG. 24, on the monitor 25 via the monitor controlling section 24, on the basis of the read corresponding definite information to allow a user to perform inputs.

When the user changes the frequency characteristics of the equalizer with the input means 28, the CPU 21 of the personal computer 20 generates a control command D20 based on the changed contents, and outputs this command to the audio amplifier 30 (FIG. 19) via the IEEE1394 interface 5 and the IEEE1394 bus 10 in order (FIG. 21: step SP6).

The IEEE1394 interface 9 of the audio amplifier 30 sends the control command D20 representing the changed contents, which has been supplied from the personal computer 20 through the IEEE1394 bus 10, to the microcomputer 42.

The CPU 43 of the microcomputer 42, when receiving the control command D20 via the IEEE1394 interface 9, makes a program RAM 49 read a program (for example, the future function block 32) corresponding to the configuration ID [1], which is stored in the memory 45, on the basis of the control command D20 via the external interfaces 46 and 47, to control the DSP 41.

The DSP 41, thereafter, performs the changing processing on the stream data D11 which is audio data supplied from the external interface 48, in accordance with a program corresponding to the configuration ID [1], in accordance with the changed contents, which is input from the user on the graphic screen described in FIG. 23, in the calculating section 50.

In this case, the DSP 41 can carefully perform changing processing on the basis of the amplification amount (width) and the damping amount (width) of one step in the amplification and damping operations of the stream data (audio data), in accordance with the program (future function block 32) corresponding to the configuration ID [1]. Thus generated changed stream data D12 is output via the external interface 51, the IEEE1394 interface 9, and the IEEE1394 bus 10 in order, to outside.

Thereby, an external speaker gives sounds having the frequency characteristics, which is set with the personal computer 20 by the user.

In this way, the personal computer 20 can exactly control the unit, by using the corresponding definite information corresponding to the configuration ID which is detailed information related to the subunit in the unit, which is connected with the IEEE1394 bus 10.

In the aforementioned configuration, the unit (audio amplifier 30) connected to the IEEE1394 bus 10 stores definite information which is specification representing functions and the control amount of the control items to be controlled by the functions, in the unit. In addition, the unit (personal computer 20), which is a controller, stores inside, corresponding definite information corresponding to the definite information stored in the unit corrected with the IEEE1394 bus 10.

Therefore, the unit (personal computer 20), which is a controller, can recognize the specification representing the functions of the unit (audio information 30) to be controlled and the control amount of control items to be controlled by the functions, from the corresponding definite information, by only acquiring the configuration ID, which is definite information, from the unit which is to be controlled (changing of specification representing the functions and the control amount of control items to be controlled by the functions), and the unit (personal computer 20), which is a controller, controls (changing of the specification representing the functions and the control amount of the control items to be controlled by the functions) the unit (audio amplifier 30) based on the recognition result.

In addition, the unit (personal computer 20), which is a controller, acquires the definite information from the unit (audio amplifier 30) which is to be controlled (changing of the specification representing the functions and the control amount of the control items to be controlled by the functions), and when it does not store corresponding definite information corresponding to the acquired definite information inside (in the hard disk drive 29), produces and stores corresponding definite information corresponding to the definite information which has not been stored.

Therefore, when the unit (personal computer 20) which is a controller to which a new unit is connected with the IEEE1394 bus 10, previously does not store corresponding definite information in the hard disk drive 29, it stores the corresponding definite information in the hard disk drive 29. As a result, the hard disk drive 29 in the unit (personal computer 20), which is a controller, can always store information corresponding to the contents of definite information stored in all units which are connected with the IEEE1394 bus 10.

Therefore, even in the case of the unit (personal computer 20), which is a controller, to which any kind of unit is connected with the IEEE1394 bus 10, it is capable of recognizing the specification representing the functions of the unit to be controlled and the control amount of the control items to be controlled by the functions, from the corresponding definite information stored inside, by acquiring the definite information in the unit, thus the unit (personal computer 20), which is a controller, can efficiently and exactly control (changing of the specification representing the functions and the control amount of the control items to be controlled by the functions) the unit (audio amplifier 30) on the basis of the recognition result.

According to the aforementioned configuration, the unit connected to the IEEE1394 bus 10 stores the definite information and the unit, which is a controller, stores the corresponding definite information corresponding to the definite information, thereby the unit connected to the IEEE1394 bus 10 can be efficiently and exactly controlled (changing of the specification representing the functions and the control amount of the control items to be controlled by the functions).

Note that, though the aforementioned embodiment has described the case in which the personal computer 20 is used as a control device which is a unit connected to the IEEE1394 bus 10, the present invention is not limited thereto and other various devices may be widely used as a control device.

Further, though the aforementioned embodiment has described the case in which the audio amplifier 30 is used as the information processing device which is a unit connected to the IEEE1394 bus 10, the present invention is not limited thereto and other various devices may be widely used as an information processing device.

Further, though the aforementioned embodiment has described the case in which the audio amplifier 30 is controlled with the AV/C command as the control command, the present invention is not limited thereto and another command may be provided and the audio amplifier 30 may be controlled under the provision. In this case, a control device which has a corresponding definite information storing means, an acquiring means, a recognizing means, and a control means may be used as a unit for controlling the audio amplifier 30.

Further, though the aforementioned embodiment has described the case in which the present invention is applied to the control system using a high performance serial bus of the IEEE1394 system, the present invention is not limited thereto and may be applied to a control system of other various system, such as a control system using a serial bus of the universal serial bus (USB) system, for example. In this case, a control device which has a corresponding definite information storing means, an acquiring means, a recognizing means, and a control means may be used as a unit which is connected to a network of another various system.

Further, though the aforementioned embodiment has described the case where the audio data is used as the stream data, the present invention is not limited thereto and other various data may be widely used as stream data, for example, a digital versatile disk (DVD)) player, or the like, is connected to the IEEE1394 bus, and image data which is obtained from the DVD inserted into the DVD player is output as stream data to the IEEE1394 bus 10.

Further, though the aforementioned embodiment has described the case where the hard disk drive 29 is used as the corresponding definite information storing means for storing corresponding definite information, the present invention is not limited thereto and other various corresponding definite information storing means such as an electrically erasable programmable read-only memory (EEPROM) may be widely used.

According to the present invention as described above, a control device stores corresponding definite information corresponding to definite information, stored in the information processing device itself, defining functions of an information processing device, the control device acquires the definite information from the information processing device, recognizes the functions of the information processing device on the basis of the corresponding definite information, stored in the control device, corresponding to the acquired definite information, and controls the information processing device of which functions have been recognized by the control device, thus making is possible to exactly and efficiently control the functions of the information processing device.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A control system, comprising:
    a data bus;
    at least one information processing device connected to said data bus, said information processing device having a storage device operable to store definite information defining functions of said information processing device;
    a control device connected to said at least one information processing device through said data bus, said control device including:
        a storage unit operable to store corresponding definite information corresponding to said definite information;
        an input unit operable to receive an entered input operation;
        an acquiring unit operable to acquire said definite information from said information processing device in response to said entered input operation;
        a recognition unit operable to read out said corresponding definite information corresponding to said definite information from said storage unit and to recognize said functions of said information processing device from said corresponding definite information corresponding to said definite information solely on the basis of said definite information; and
        a control unit operable to control said information processing device on the basis of said recognized functions.

2. The control system according to claim 1, wherein:
    information representing the contents of function blocks is stored as said definite information in said storage device for each of said function blocks which are expressed as a unit of executing logical functions of said information processing device; and
    information corresponding to said definite information representing the contents of said function blocks is stored in said storage unit as said corresponding definite information for each of said function blocks.

3. The control system according to claim 1, wherein:
    information representing an amount of control items to be controlled by function blocks is stored in said storage device as said definite information for each of said function blocks which are expressed as a unit of executing logical functions of said information processing device; and
    information corresponding to said definite information representing said amount of control items to be controlled by said function blocks is stored in said storage unit as said corresponding definite information for each of said function blocks.

4. The control system according to claim 1, wherein:
    information representing the contents of function blocks is stored as said definite information in said storage device for each combination of said function blocks which are expressed as a unit of executing logical functions of said information processing device; and
    information corresponding to said definite information representing the contents of said function blocks is stored in said storage unit as said corresponding definite information for each combination of said function blocks.

5. The control system according to claim 1, wherein:
    information representing an amount of control items to be controlled by function blocks is stored in said storage device as said definite information for each combination of said function blocks which are expressed as a unit of executing logical functions of said information processing device; and
    information corresponding to said definite information representing said amount of control items to be controlled by said function blocks is stored in said storage unit as said corresponding definite information for each combination of said function blocks.

6. The control system according to claim 1, wherein said control device includes a producing unit operable to produce new corresponding definite information corresponding to said definite information when said storage unit does not contain said corresponding definite information.

7. A control device to which at least one information processing device to be controlled is connected by a data bus, the information processing device storing definite information defining functions of the information processing device, the control device comprising:
    a storage unit operable to store corresponding definite information corresponding to the definite information;
    an input unit operable to receive an entered input operation;
    an acquiring unit operable to acquire the definite information from the information processing device in response to said entered input operation;
    a recognizing unit operable to read out said corresponding definite information corresponding to said definite information from said storage unit and to recognize the functions of the information processing device from said corresponding definite information corresponding to said definite information solely on the basis of said definite information; and a control unit operable to control the information processing device on the basis of said recognized functions.

8. The control device according to claim 7, wherein:

information representing the contents of function blocks is stored as the definite information in the information processing device for each of said function blocks which are expressed as a unit of executing logical functions of the information processing device; and information corresponding to the definite information representing the contents of said function blocks is stored in said storage unit as said corresponding definite information for each of said function blocks.

9. The control device according to claim 7, wherein:

information representing an amount of control items to be controlled by function blocks is stored in the information processing device as the definite information for each of said function blocks which are expressed as a unit of executing logical functions of the information processing device; and information corresponding to the definite information representing said amount of control items to be controlled by said function blocks is stored in said control device as said corresponding definite information for each of said function blocks.

10. The control device according to claim 7, wherein:

information representing the contents of function blocks is stored as the definite information in the information processing device for each combination of said function blocks which are expressed as a unit of executing logical functions of the information processing device; and information corresponding to the definite information representing the contents of said function blocks is stored in said storage unit as said corresponding definite information for each combination of said function blocks.

11. The control device according to claim 7, wherein:

information representing an amount of control items to be controlled by function blocks is stored in the information processing device as the definite information for each combination of said function blocks which are expressed as a unit of executing logical functions of the information processing device; and information corresponding to the definite information representing said amount of control items to be controlled by said function blocks is stored in said storage unit as said corresponding definite information for each combination of said function blocks.

12. The control device according to claim 7, further comprising:

a producing unit operable to produce new corresponding definite information corresponding to the definite information when said storage unit does not contain said corresponding definite information.

13. A method of controlling an information processing device by a control device in a control system in which the control device and the information processing device are connected to each other by a data bus, said method comprising:

receiving an entered input operation at the control device;

operating the control device to acquire definite information from the information processing device in response to said entered input operation, the definite information defining functions of the information processing device;

storing said corresponding definite information corresponding to the definite information in said control device when said corresponding definite information is not already stored therein;

reading out said stored corresponding definite information corresponding to said definite information;

recognizing in the control device the functions of the information processing device from said corresponding definite information corresponding to said definite information solely on the basis of the definite information; and operating the control device to control the information processing device on the basis of the recognized functions.

14. The control method according to claim 13, wherein:

information representing the contents of function blocks is stored as the definite information in the information processing device for each of the function blocks which are expressed as a unit of executing logical functions of the information processing device; and information corresponding to the definite information which represent the contents of the function blocks is stored in the control device as the corresponding definite information for each of the function blocks.

15. The control method according to claim 13, wherein:

information representing an amount of control items to be controlled by function blocks is stored in the information processing device as the definite information for each of the function blocks which are expressed as a unit of executing logical functions of the information processing device; and information corresponding to the definite information representing the amount of the control items to be controlled by the function blocks is stored in the control device as the corresponding definite information for each of the function blocks.

16. The control method according to claim 13, wherein:

information representing the contents of function blocks is stored as the definite information in the information processing device for each combination of the function blocks which are expressed as a unit of executing logical functions of the information processing device; and information corresponding to the definite information representing the contents of the function blocks is stored in the control device as the corresponding definite information for each combination of the function blocks.

17. The control method according to claim 13, wherein:

information representing an amount of control items to be controlled by function blocks is stored in the information processing device as the definite information for each combination of the function blocks which are expressed as a unit of executing logical functions of the information processing device; and information corresponding to the definite information representing the amount of control items to be controlled by the function blocks is stored in the control device as the corresponding definite information for each combination of the function blocks.

18. The control method according to claim 13, further comprising:

producing said corresponding definite information corresponding to the definite information when the control device does not contain the corresponding definite information; and storing the new corresponding definite information.

* * * * *